US011542989B2

(12) United States Patent
Grubba (10) Patent No.: US 11,542,989 B2
(45) Date of Patent: Jan. 3, 2023

(54) COUPLING DEVICE FOR ROTABLY COUPLING A SHAFT WITH A GEARBOX IN A GEARED TURBO FAN ENGINE

(71) Applicant: Rolls-Royce Deutschland Ltd & Co KG, Blankenfelde-Mahlow (DE)

(72) Inventor: Tomasz Grubba, Zeuthen (DE)

(73) Assignee: ROLLS-ROYCE DEUTSCHLAND LTD & CO KG, Blankenfelde-Mahlow (DE)

(*) Notice: Subject to any disclaimer, the term of this patent is extended or adjusted under 35 U.S.C. 154(b) by 1113 days.

(21) Appl. No.: 16/164,207

(22) Filed: Oct. 18, 2018

(65) Prior Publication Data
US 2019/0162240 A1 May 30, 2019

(30) Foreign Application Priority Data

Nov. 30, 2017 (DE) ............. 10 2017 128 490.7

(51) Int. Cl.
*F16D 3/74* (2006.01)
*F16D 1/10* (2006.01)

(52) U.S. Cl.
CPC .......... *F16D 3/74* (2013.01); *F16D 2001/103* (2013.01)

(58) Field of Classification Search
CPC .... F02C 7/36; F05D 2200/22; F05D 2200/23; F05D 2250/71; F05D 2250/711; F05D 2250/712; F05D 2250/713; F05D 2260/40; F05D 2260/40311; F05D 2260/94; F16D 3/72; F16D 3/725; F16D 3/74; F16D 3/76; F16D 3/77; F16D 2001/103; F16D 2003/745

USPC ............ 464/88, 98, 99, 149, 157, 158, 159
See application file for complete search history.

(56) References Cited

U.S. PATENT DOCUMENTS

| | | | | |
|---|---|---|---|---|
| 3,024,628 A | * | 3/1962 | Yang | F16D 3/74 464/88 |
| 4,095,530 A | * | 6/1978 | Korber | F16D 3/76 105/131 |
| 4,107,950 A | * | 8/1978 | Wildhaber | F16D 3/77 464/99 |

(Continued)

FOREIGN PATENT DOCUMENTS

| | | | | |
|---|---|---|---|---|
| DE | 1525341 A1 | * | 7/1969 | ............. F16D 3/76 |
| DE | 2255680 A1 | * | 5/1974 | ............. F16D 3/76 |

(Continued)

OTHER PUBLICATIONS

German Search Report dated Jul. 3, 2018 for counterpart German Patent Application No. 10 2017 128 490.7.

(Continued)

*Primary Examiner* — Josh Skroupa
(74) *Attorney, Agent, or Firm* — Shuttleworth & Ingersoll, PLC; Timothy J. Klima (57) ABSTRACT

A coupling device for rotably coupling a shaft with a gearbox in a geared turbo fan aircraft engine, wherein the coupling device includes a connection to the shaft at a first end and a connection to the gearbox at a second end, the first and the second ends being axially separated and at least one curved shape between the first end and the second end extending from the gearbox radially inwards to the shaft and the at least one curved shape including at least one cross-section in the axial direction of the engine with a logarithmic profile or a power profile.

18 Claims, 5 Drawing Sheets

(56) References Cited

U.S. PATENT DOCUMENTS

| | | | | |
|---|---|---|---|---|
| 4,411,634 | A | * | 10/1983 | Hammelmann ........... F16D 3/74 464/99 |
| 5,000,722 | A | * | 3/1991 | Zilberman ................ F16D 3/74 464/80 |
| 5,588,917 | A | * | 12/1996 | D'Ercole .................. F16D 3/74 464/147 |
| 5,899,813 | A | * | 5/1999 | Bunce ...................... F16D 3/77 464/99 |
| 5,961,244 | A | * | 10/1999 | Hahn ...................... F01K 11/02 403/291 |
| 7,544,130 | B2 | * | 6/2009 | Nisley ...................... F16D 3/74 464/88 |
| 8,523,686 | B2 | * | 9/2013 | Goujet ..................... F16D 3/72 464/79 |
| 8,591,345 | B2 | * | 11/2013 | Stocco ..................... F16D 3/79 464/99 |
| 9,758,962 | B2 | * | 9/2017 | Geislinger ................ F16D 3/74 |
| 2003/0157987 | A1 | * | 8/2003 | Zilberman ................ F16D 3/74 464/91 |
| 2009/0298640 | A1 | | 12/2009 | Duong et al. |
| 2012/0077607 | A1 | | 3/2012 | Goujet |
| 2014/0155213 | A1 | | 6/2014 | Sheridan |
| 2016/0222888 | A1 | | 8/2016 | Sheridan |

FOREIGN PATENT DOCUMENTS

| | | | | |
|---|---|---|---|---|
| DE | 3302777 | A1 | * 8/1984 | ............... F16D 3/76 |
| DE | 4215540 | A1 | * 11/1993 | ............... F16D 3/76 |
| EP | 1777380 | A2 | 4/2007 | |
| EP | 3002434 | A1 | 4/2016 | |
| EP | 3144487 | A1 | 3/2017 | |
| GB | 2544036 | A | 5/2017 | |

OTHER PUBLICATIONS

European Search Report dated Apr. 30, 2019 from counterpart EP App No. 18205169.8.

* cited by examiner

COUPLING DEVICE FOR ROTABLY COUPLING A SHAFT WITH A GEARBOX IN A GEARED TURBO FAN ENGINE

This application claims priority to German Patent Application DE102017128490.7 filed Nov. 30, 2017, the entirety of which is incorporated by reference herein.

The invention relates to a system for a coupling device for rotably coupling a shaft with a gearbox in a geared turbo fan engine with the features of claim 1.

Geared turbo fan engines for aircrafts comprise a gearbox which transforms the high rotational speed of a turbine section to a lower rotational speed of a propulsive fan in the turbo fan engine. By allowing different rotational speeds between the turbine section and the propulsive fan, the overall efficiency of the aircraft engine is improved.

The gearbox has to handle considerable mechanical loads, in particular torque loads, so an effective torque transmission from or to the gearbox within the aircraft engine is required.

Couplings for geared turbo fan engines are e.g. described in EP 3 144 487 A1.

This issue is addressed by the coupling device with the features of claim 1.

The coupling device rotably couples a shaft with a gearbox in the geared turbo fan aircraft engine. The coupling device comprises a connection to the shaft at a first end and a connection to the gearbox at a second end, the first and the second ends being axially separated from each other. Between the first and second end at least one curved shape extending from the gearbox radially inwards to the shaft is located; i.e. the coupling device can have other sections which are differently formed, but at least one curved shape. This at least one curved shaped comprises at least one cross-section in the axial direction of the engine with a logarithmic profile or a power profile. The logarithmic profile can be mathematically described by a logarithmic or exponential functional relationship for which examples will be given below.

Having at least one logarithmic profile section or at least one power profile in the coupling device, it provides a very high ratio of torsional stiffness over the lateral one at lowest weight penalty, subject e.g. to stress constraints.

In one embodiment the logarithmic profile or the power profile applies to a median line of the coupling device, a cross-section of an inner surface of the coupling device and/or a cross-section of an outer surface of the coupling device. This means that the logarithmic profile or power profile can be applied to different lines or shapes of the coupling device.

In one embodiment of the coupling device the logarithmic profile or the power profile approaches asymptotically a line parallel to the rotational axis of the geared turbo fan engine or the logarithmic profile or the power profile approaches asymptotically a line perpendicular to the rotational axis of the geared turbo fan engine. In particular, the asymptotic approach can be at a torque input or torque output of the gearbox (i.e. the second end of the coupling device), in particular a carrier for planetary gears or a ring gear mount of the gearbox. In this case the torque input or output are asymptotically approached, i.e. the tangents towards the gearbox gets flatter. It is also possible, that the asymptotic approach is not at the second end of the coupling device, e.g. at one point between the first and the second end.

In one embodiment the at least one curved shape of a coupling device is considered to have a logarithmic profile if a logarithmic curve of the form $$r(x)=A1+A2\ln(x)$$

can be fitted to at least a section of the median line, the inner surface shape and/or the outer surface shape with a regression coefficient of $r2=0.9$ or more.

The curved shape of a coupling device is considered to have a power profile to which a power curve of the form $$r(x)=A1x^{A2}$$

can be fitted to at least a section of the median line, the inner surface shape and/or the outer surface shape with a regression coefficient of $r2=0.9$ or more.

In a further embodiment of the coupling device the radius measured from the rotational axis to the coupling device is constant over at least one axial section, in particular, at the torque input or torque output of the gearbox, in particular a carrier for planetary gears or a ring gear mount of the gearbox. This means that the coupling device comprises the at least one logarithmically or power shaped curved section and a tubular section with a constant radius. The tubular part can e.g. be used to save space within the engine close to the gearbox.

In another embodiment the coupling device has a cross-sectional thickness that varies at least along some section between the first end and the second end. In particular, the thickness of the cross-section decreases at least in parts from the first end and the second end, in particular, it decreases monotonously. In this particular embodiment the thickness is largest in the connection point to the shaft and thinnest at the connection to the gearbox. In one particular embodiment the thickness varies logarithmically or according to a power law along the curved shaped part.

It is possible that the thickness of the cross-section varies with the same functional relationship as the curved shape.

It is possible that in one embodiment of the coupling device the cross-section comprises a maximal radius between the first end and the second end. The radius at the torque input or torque output of the gearbox is smaller than the maximal radius.

It is also possible that the coupling device comprises a plurality of oil holes symmetrically positioned around a circumference of the coupling device, in particular positioned at the maximum radius. In this case it is possible, that the cross-section is thickened around the oil holes.

Typically, an embodiment of a coupling device can have a maximal radius between 50 and 200 mm. The axial extension of the logarithmic profile or the power profile can be between 40 and 200 mm.

The connection between the coupling device with the shaft can e.g. be made with a spline connection.

Embodiments of the invention are shown in the figures, where.

Figure 1:
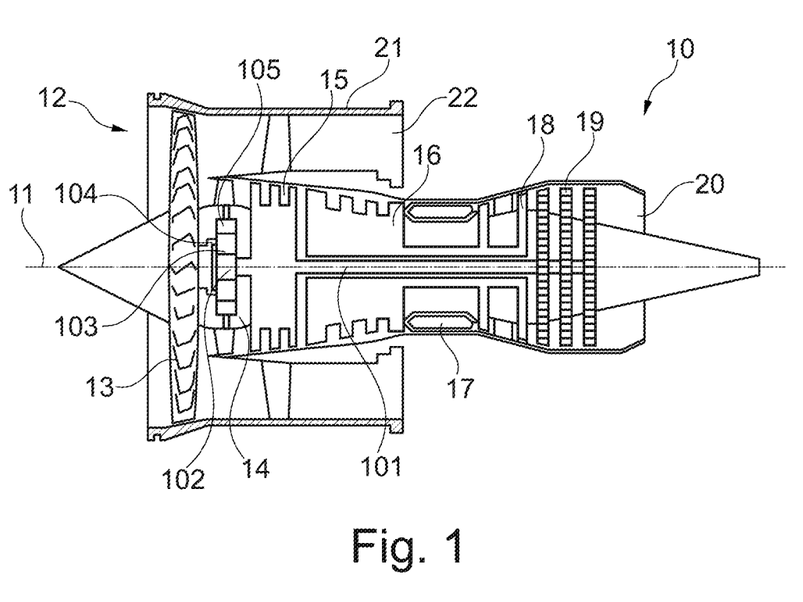
FIG. 1 shows a schematic drawing of a geared turbo fan engine according to the prior art.

With reference to FIG. 1, a geared turbo fan engine for an aircraft is generally indicated at 10, having a principal and rotational axis 11. The engine 10 comprises, in axial flow series, an air intake 12, a propulsive fan 13 (could be more than one stage), a gearbox 14, an intermediate pressure compressor 15, a high-pressure compressor 16, a combustion equipment 17, a high-pressure turbine 18, an intermediate-pressure turbine 19 and an exhaust nozzle 20. A fan casing 21 generally surrounds the engine 10 and defines the intake 12.

The geared turbo fan engine 10 works in the conventional manner so that air entering the intake 12 is accelerated by the propulsive fan 13 to produce two air flows: a first air flow into the intermediate pressure compressor 15 and a second air flow which passes through a bypass duct 22 to provide propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture is combusted. The resultant hot combustion products then expand through, and thereby drive the high pressure turbine 18 and intermediate pressure turbine 19 (i.e. turbine sections) before being exhausted through the nozzle 20 to provide additional propulsive thrust. The high pressure turbine 18 and the intermediate pressure turbine 19, respectively, drive the high pressure compressor 16 and the intermediate pressure compressor 15, each by suitable interconnecting shaft assembly.

An intermediate pressure shaft 101 also drives the propulsive fan 13 via the gearbox 14. The gearbox 14 is a reduction gearbox in that it gears down the rate of rotation of the propulsive fan 13 by comparison with the intermediate pressure compressor 15 and intermediate pressure turbine 19.

The gearbox 14 is an epicyclic planetary gearbox having a static ring gear mount 105 (e.g. here two parallel ring gears), rotating and orbiting planet gears 103 supported by a planet carrier 104 and a rotating sun gear 102. In the embodiment shown the torque output of the gearbox 14 is through the carrier 104, the torque input via the sun gear 102. In principle, other gearbox 14 designs can be used, e.g. the torque output can be via a rotatable ring gear mount 105.

The embodiment shown in FIG. 1 has a specific shaft arrangement which is understood not to be limiting. The embodiments described in the following can also work with a 2- or 3-shaft arrangement.

In FIG. 1 the coupling of the at least one ring gear 1 within a casing 21 of the geared turbo fan engine 10 is only shown schematically.

Figure 2:
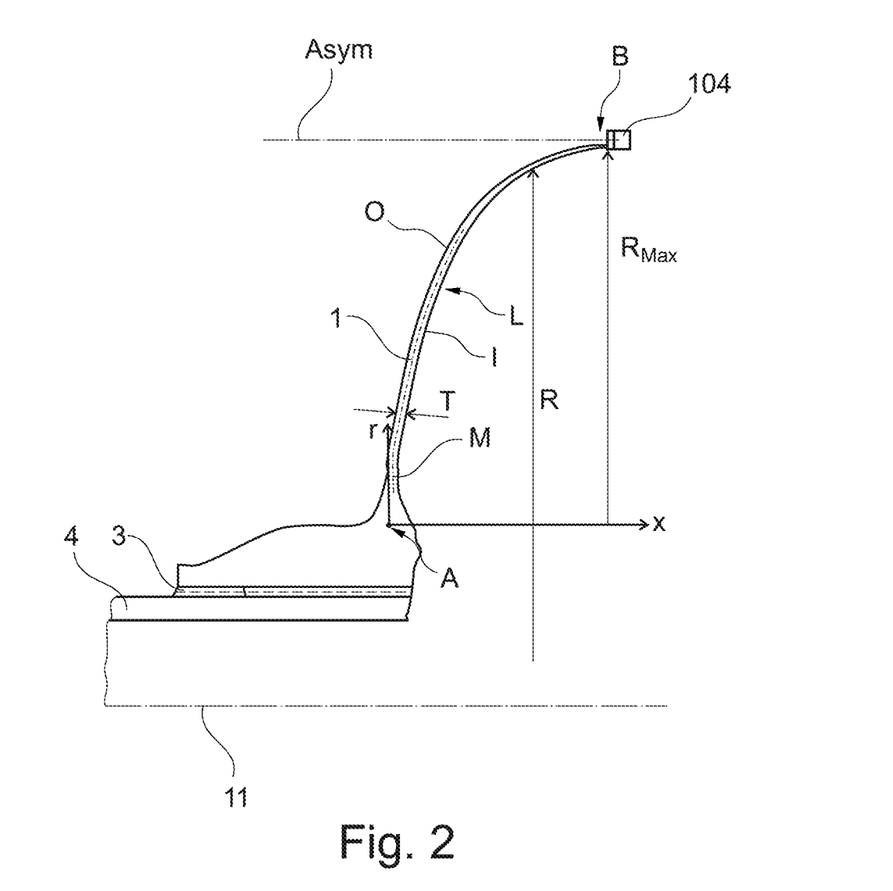
FIG. 2 shows a cross-sectional view of an embodiment of a coupling between a fan shaft and a gearbox.
Figure 3:
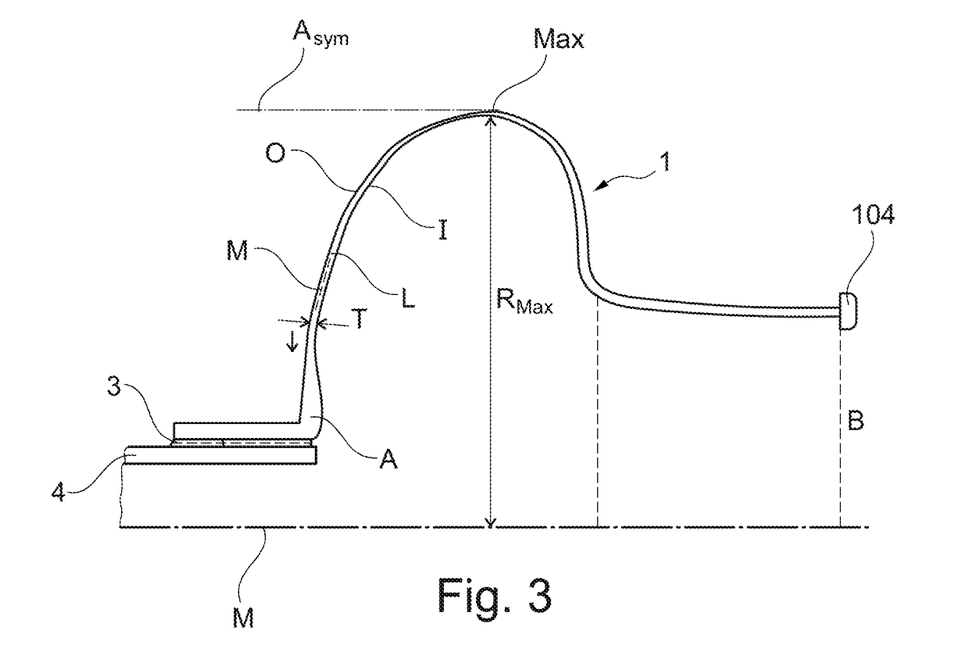
FIG. 3 shows a cross-sectional view of a further embodiment of a coupling between a fan shaft and a gearbox.

In the following embodiments coupling devices 1 are shown coupling the gearbox 14 with a shaft 4. In FIGS. 2 and 3 embodiments are shown in which the torque output of the gearbox 14 (here via the carrier 104 of the planetary gears 103) is coupled to the shaft 4 driving the propulsive fan 13. The coupling device 1 transfers torque from the gearbox 14 to the propulsive fan 13.

In FIG. 2 the coupling device 1 is connected through a spline connection 3 to the fan shaft 4 which drives the propulsive fan 13 (not shown in FIG. 2). The connection to fan shaft 4 defines the first end A of the coupling device 1. The second end B is at the torque output of the gearbox 14, i.e. at the carrier 104.

The first and the second ends A, B are axially spaced apart along the axis of the geared turbo fan engine 10 (not shown in FIG. 2).

The coupling device 1 shown in FIG. 2 comprises one curved shape between the first end A and the second end B extending from the gearbox 14 (i.e. the carrier 104 in FIG. 2) radially inwards towards the shaft 4. This means the coupling device arcs inwards form the torque output of the gearbox 14 towards the shaft 4. The maximum radius Rmax of this embodiment is at the torque output of the gearbox 14, i.e. the second end B. The minimum radius is at the first end A at the shaft A. In other embodiments (e.g. shown in FIG. 2A or 3) the shape of the coupling device 1 can be different or more complex and can also comprise more than one curved shapes.

The curved shape of the coupling device 1 comprises one cross-section in the axial direction of the engine with a logarithmic profile L. In the embodiment shown the logarithmic profile L extends almost from the first end A to the second B. In alternative embodiments the logarithmic profile does only extend over a part of the curved shape.

In the embodiment shown it is assumed that the median line M follows the logarithmic profile L. It is possible that the inner surface I or the outer surface O follow the logarithmic profile L. Also combinations, e.g. inner surface I, median line M and the outer surface O have a logarithmic shape L, but with slightly different curvature since the cross-sectional thickness T of the coupling device 1 is highest at the first end A, and smallest at the second end B.

For sake of simplicity the logarithmic profile L of the median line M is discussed in the following.

The logarithmic profile L of the cross-section approaches asymptotically a line Asym which is in this embodiment parallel to the rotational axis 11. That means that at the second end B the median line M is almost parallel to the rotational axes.

It is understood that a shape of a coupling device is considered to have a logarithmic profile if a logarithmic curve $$r(x) = A1 + A2 \ln(x)$$

can be fitted to at least a section of the median line M, the inner surface I and/or the outer surface shape with a regression coefficient of r2=0.9 or more. A1, A2 are the model parameter of the logarithmic model. The origin of the coordinate system for this expression would be on the line Asym (not shown in FIG. 2).

The logarithmic relationship can be described as a different functional relationship. One coordinate system is chosen here, where the origin is placed at the first end A.

The axial coordinate x extends towards the back of the geared turbofan engine 10, i.e. away from the propulsive fan 14. The coordinate r(x) extends from the first end A radially outwards. The logarithmic profile L as r(x)—given these coordinates—follows the following exponential equation (A1, A2 as arbitrary constants)

$$r(x) = R\max - A1 e^{-A2 \, x}$$

As x increases from the first end A to the right in FIG. 2, the logarithmic profile L (as a function of x) approaches Rmax at the second end B, i.e. it approaches the line Asym parallel to the rotational axis 11. It should be noted that the maximal radius of the coupling device 1 is Rmax (as shown in FIG. 2) plus the offset of the origin of the coordinate system from the rotational axis 11. This equation given above is to be understood as model equation for the logarithmic profile L only. The realization of the coupling device 1 might show some deviation from the exact mathematical logarithmic shape.

It is also understood that the mathematical representation of the logarithmic profile L can be made with an exponential equation or a logarithmic equation, depending on the coordinate system chosen. In the embodiment of FIG. 2 the logarithmic profile L approaches the second end B asymptotically.

In a further embodiment not depicted here, the curved shape can follow a power law:

$$r(x)=A1 x^{A2}$$

This means that a curve with this profile can be fitted to at least a section of the median line M, the inner surface I and/or the outer surface shape with a regression coefficient of r2=0.9 or more. A1, A2 are the model parameter of the power model.

The coupling device 1 forms in the embodiment of FIG. 2 a flexible output coupling with at least one section with a logarithmic profile. It has been found that this maximizes the lateral flexibility and the rotational (torsional) stiffness—usually mutually contradictory requirements—at the lowest weight penalty and under a given allowable stress constraint. One possible objective function which is satisfied by embodiments described herein is the ratio (Torsional stiffness/Lateral stiffness)→max.

The coupling device 1 with the logarithmic profile L also has good buckling and stress/fatigue properties. In fact, the logarithmic shape and variable thickness of the coupling device 1 make the latter optimized for stress vs. weight.

Figure 2A:
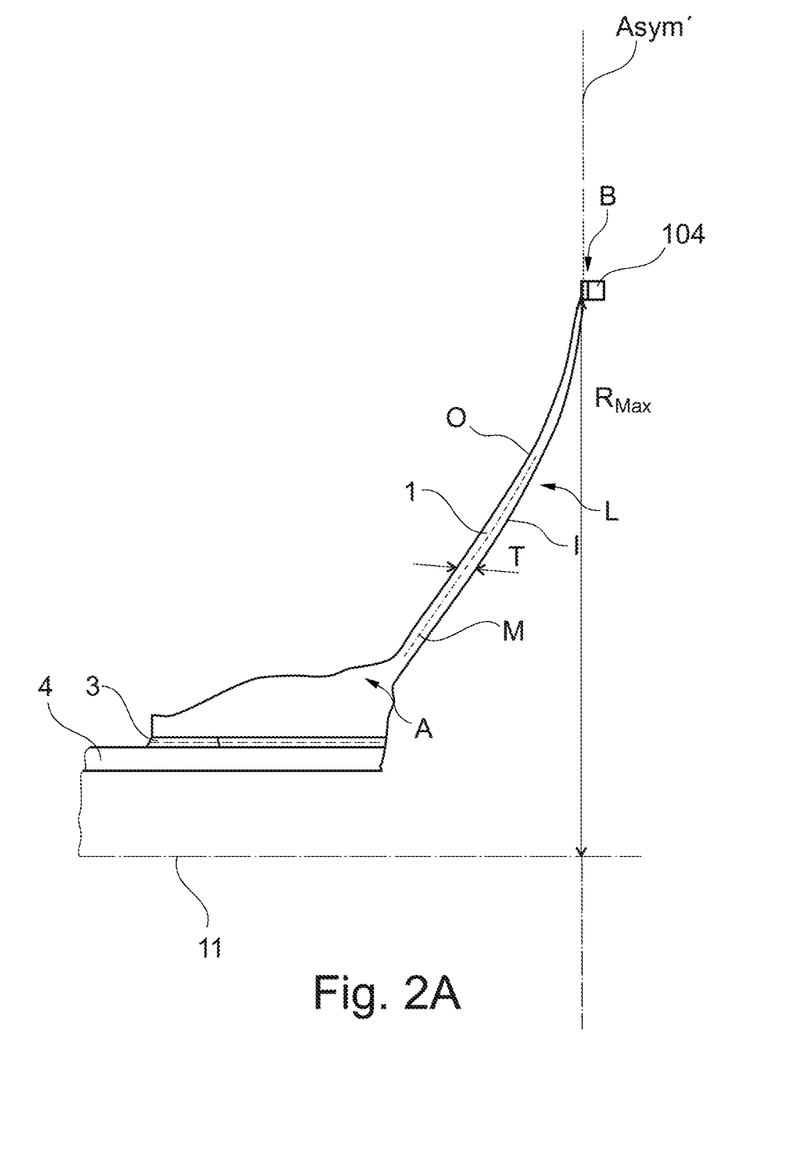
FIG. 2A shows a variation of the embodiment shown in FIG. 2.

In FIG. 2A an alternative embodiment of the one described in FIG. 2 is shown. Reference can be made to the respective description.

In FIG. 2A the curvature of the logarithmic shape L is different, i.e. the asymptote Asym' is perpendicular to the rotational axis 11. The functional relationship for the logarithmic profile L in this case would be (given a suitable coordinate system)

$$r(x)=-\ln(x(R\ max)-x)$$

If x approaches the axial position of Rmax, the curvature asymptotically approaches the line Asym' perpendicular to the rotational axis 11. In embodiments of FIGS. 2 and 2A the asymptotes are approached at point B, i.e. the carrier 104.

Figure 2B:
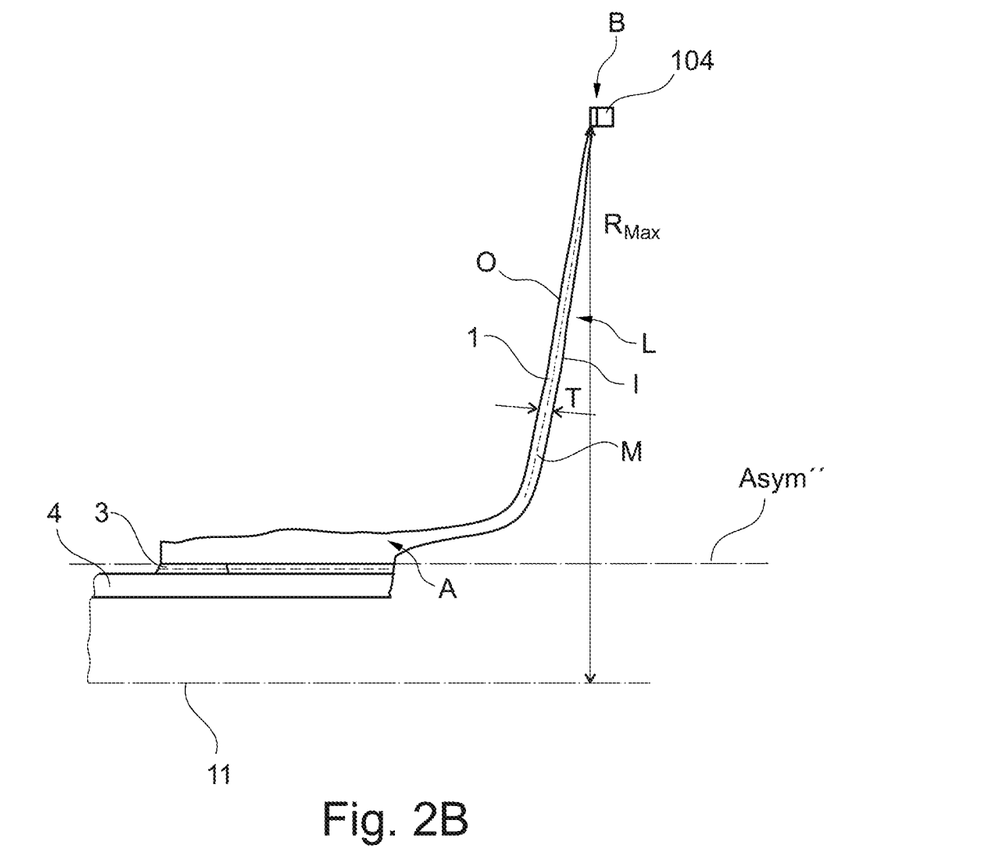
FIG. 2B shows a variation of the embodiment shown in FIG. 2.

In FIG. 2B a further embodiment is shown, in which the logarithmic shape L approaches the Point A, i.e. the spline connection 3 asymptotically with the Asymptote Asym" being parallel to the rotational axis. The functional relationship for the logarithmic profile L in this case would be (given a suitable coordinate system)

$$r(x)=A1+A2 e^{x}$$

In FIG. 3 a different embodiment of coupling device 1 is shown. The design context of the coupling device 1 is the same as in the embodiment shown in FIG. 2 so that reference can be made to the relevant description.

The embodiment shown in FIG. 2, comprises a logarithmic profile L starting at the first end A (i.e. at the connection of the coupling device 1 with the fan shaft 4) which approaches the point Max on the coupling device 1 which is the point of the maximum radius Rmax. The shape of the logarithmic profile L in the one section of the coupling device 1 can be determined as described in connection with the previous embodiment.

The second end B of the coupling device 1 is coupled to the carrier 104 of the gearbox 14. The radius R measured from the rotational axis 11 to the coupling device 1 here is constant in a section extending from the second end B towards the front of the geared turbo fan engine 10. The radius R is considerably smaller than RMax in the section with the constant radius R. With this design some special constraints in the vicinity of the gearbox 14 can be addressed.

Typically, an embodiment of a coupling device 1 can have a maximal radius Rmax between 50 and 200 mm, in particular 100 mm. In the embodiment of FIG. 2 this would be the radius at the second end B. In the embodiment of FIG. 3 this would be the maximal Radius at Point Max. The axial extension of the logarithmic profile L or the power profile can be between 40 and 200 mm (embodiment of FIG. 2, 2A: between first and second ends A, B; embodiment of FIG. 3: between first end and point Max). These values are typical for several geared turbofan engines.

The curved shape of the embodiment shown in FIG. 3 could also be in the form of the shape shown in FIG. 2A.

The coupling device 1, of which cross-sections are shown in FIGS. 2, 2A and 3, is a body of revolution since it extends circumferentially around the rotational axis 11. Within the cavity inside the coupling device 1, oil is present to lubricate the spline connection 3, the shafts 4, bearings (not shown) and other units within the coupling device 1.

To allow scavenging the oil from the inside, oil holes 2 are positioned e.g. at the position of the maximal radius Rmax in the embodiment of FIG. 3.

Figure 3A:
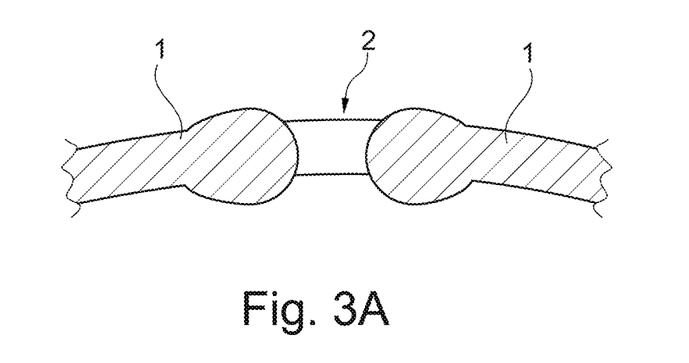
FIG. 3A shows a cross-section of a detail of an oil hole in the embodiment shown in FIG. 3.

The oil holes 2 are positioned symmetrically around the circumference of the coupling device 1. Since the oil holes structurally weaken the coupling device locally, the thickness of the coupling device 1 is locally increased as e.g. shown in FIG. 3A.

In principle, it is also possible to locate the oil holes in other sections of the coupling device.

LIST OF REFERENCE NUMBERS 1 coupling device
2 oil holes
3 spline connection to shaft
4 fan shaft
10 geared turbo fan engine
11 principal rotational axis
12 air intake
13 propulsive fan
14 gearbox, power gearbox
15 intermediate pressure compressor
16 high-pressure compressor
17 combustion equipment
18 high-pressure turbine
19 intermediate-pressure turbine
20 exhaust nozzle
21 fan casing
22 by-pass duct
101 intermediate pressure shaft
102 sun gear
103 planetary gears
104 carrier of the planetary gears
105 ring gear mount
A first end of coupling device
A1 model parameter
A2 model parameter
Asym asymptote of logarithmic profile
Asym' asymptote of logarithmic profile
Asym" asymptote of logarithmic profile
B second end of coupling device
I inner surface of coupling device
L logarithmic profile M median line of coupling device
Max point on the coupling device at Rmax
O outer surface of coupling device
r radial coordinate in a coordinate system
R radius
Rmax maximal radius
T thickness of cross-section of the coupling device
X axial coordinate in a coordinate system

The invention claimed is:

1. A coupling device, comprising:
a body comprising:
a first end configured for connection with a shaft;
a second end configured for connection to a gearbox of a geared turbo fan aircraft engine, to couple the gearbox to the shaft, the second end being:
spaced apart from the first end in an axial direction of the engine; and
spaced apart from the first end in a radially outwardly direction of the engine;
a central portion extending from the first end to the second end in both the axial direction and the radially outwardly direction, the central portion including a curved shape extending from the first end to the second end, the curved shape having a non-reversing slope and including a cross-section in the axial direction having a logarithmic profile or a power profile;
wherein the cross-section has a cross-sectional thickness that is highest at the first end and smallest at the second end.

2. The coupling device according to claim 1, wherein the logarithmic profile or the power profile applies to a median line of the central portion, a cross-section of an inner surface of the central portion and/or a cross-section of an outer surface of the central portion.

3. The coupling device according to claim 1, wherein the logarithmic profile or the power profile approaches asymptotically a line parallel to a rotational axis of the coupling device or the logarithmic profile approaches asymptotically a line perpendicular to the rotational axis, at a torque input or torque output of the gearbox, at a carrier for planetary gears or a ring gear mount of the gearbox.

4. The coupling device according to claim 2, wherein the curved shape has the logarithmic profile to which a logarithmic curve $$r(x)=A1+A2 ln(x)$$

is fitted to at least a section of the median line, the inner surface and/or the outer surface, wherein:
x=an axial coordinate;
r(x)=a radius of the curved shape at the axial coordinate;
A1=a first model parameter; and
A2=a second model parameter.

5. The coupling device according to claim 1, wherein the curved shape has the power profile to which a power curve $$r(x)=A1x^{A2}$$

is fitted to at least a section of the median line, the inner surface and/or the outer surface, wherein:
x=an axial coordinate;
r(x)=a radius of the curved shape at the axial coordinate;
A1=a first model parameter; and
A2=a second model parameter.

6. The coupling device according to claim 1, wherein a radius measured from a rotational axis of the coupling device to the coupling device is constant over at least one axial section, in particular, at a torque input or a torque output of the gearbox, at a carrier for planetary gears or a ring gear mount of the gearbox.

7. The coupling device according to claim 1, wherein the cross-sectional thickness varies at least along some section between the first end and the second end.

8. The coupling device according to claim 7, wherein the cross-sectional thickness decreases at least in parts from the first end and the second end.

9. The coupling device according to claim 7, wherein the cross-sectional thickness varies logarithmically or according to a power law at least in parts from the first end and the second end.

10. The coupling device according to claim 9, wherein a radius of the coupling device at a torque input or a torque output of the gearbox is smaller than the maximal radius.

11. The coupling device according to claim 7, wherein the cross-sectional thickness varies with a same functional relationship as the curved shape.

12. The coupling device according to claim 1, wherein the cross-section comprises a maximal radius between the first end and the second end.

13. The coupling device according to claim 1, and further comprising a plurality of oil holes symmetrically positioned around a circumference of the coupling device.

14. The coupling device according to claim 13, wherein the cross-section is thickened around the oil holes.

15. The coupling device according to claim 1, wherein a maxima radius is between 50 and 200 mm.

16. The coupling device according to claim 1, wherein the curved shape has the logarithmic profile and an axial extension of the logarithmic profile is between 40 and 200 mm.

17. The coupling device according to claim 1, and further comprising a spline connection at the first end.

18. A geared turbo fan engine with at least one coupling device according to claim 1.

* * * * *